United States Patent [19]

Johnson

[11] Patent Number: 5,122,352
[45] Date of Patent: Jun. 16, 1992

[54] HEAT EXCHANGER AND POLLUTANT REMOVAL SYSTEM

[76] Inventor: Arthur F. Johnson, 240 Fox Dr., Boulder, Colo. 80303

[21] Appl. No.: 567,492

[22] Filed: Aug. 14, 1990

Related U.S. Application Data

[63] Continuation-in-part of Ser. No. 372,492, Jun. 28, 1989, abandoned, which is a continuation-in-part of Ser. No. 165,312, Mar. 8, 1988, Pat. No. 4,874,585.

[51] Int. Cl.$^5$ .................. C01B 17/00; C01B 17/69; C01C 1/24; F28B 3/00
[52] U.S. Cl. .................. 423/242; 423/522; 423/545; 423/549; 165/111; 165/913; 165/921; 55/73
[58] Field of Search ............ 423/522, 547, 239, 242, 423/545, 549; 165/111, 913, 921; 55/73

[56] References Cited

U.S. PATENT DOCUMENTS

| | | | |
|---|---|---|---|
| 3,607,034 | 9/1971 | Henery | 423/522 |
| 3,676,059 | 6/1970 | Welty, Jr. | 423/547 |
| 3,839,849 | 10/1974 | Maniya | 55/73 |
| 3,880,618 | 4/1975 | McCrea et al. | 423/239 |
| 4,101,635 | 7/1978 | Nambu et al. | 423/522 |
| 4,140,175 | 2/1979 | Darm | 165/115 |
| 4,160,810 | 7/1979 | Benson et al. | 423/223 |
| 4,339,883 | 7/1982 | Waldmann | 34/27 |
| 4,409,191 | 10/1983 | Osman | 423/228 |
| 4,444,128 | 4/1984 | Monro | 110/345 |
| 4,452,620 | 6/1984 | Dosmond | 62/238.6 |
| 4,454,100 | 6/1984 | Faatz | 423/522 |
| 4,466,815 | 8/1984 | Southam | 423/522 |
| 4,487,139 | 12/1984 | Warner | 110/345 |
| 4,600,561 | 7/1986 | Frei | 422/170 |
| 4,619,671 | 10/1986 | Ruff et al. | 55/222 |
| 4,744,967 | 5/1988 | Brand et al. | 423/533 |
| 4,776,391 | 10/1988 | Warner | 165/111 |
| 4,793,981 | 12/1988 | Doyle et al. | 423/239 |
| 4,829,911 | 5/1989 | Nielson | 110/234 |
| 4,874,585 | 10/1989 | Johnson et al. | 422/171 |
| 4,910,011 | 3/1990 | Dorr et al. | 423/522 |
| 4,932,334 | 6/1990 | Patte et al. | 110/216 |

FOREIGN PATENT DOCUMENTS

| | | |
|---|---|---|
| 3541252 | 9/1986 | Fed. Rep. of Germany . |
| T035972 | 8/1985 | Hungary . |
| 55-105535 | 8/1980 | Japan . |

OTHER PUBLICATIONS

Unit Processes and Principle of Chemical Engineering by John C. Olsen, PhD. D.Sc.

Primary Examiner—Gary P. Straub
Attorney, Agent, or Firm—Pennie & Edmonds

[57] ABSTRACT

A system for cooling flue gases from a fossil fuel boiler plant, and removing pollutants from the flue gas, is disclosed. In a first section of the apparatus, heat exchange cools the flue gas to just above the condensation point of water, and condensed $H_2SO_4$ is collected. In a second section, the gas is cooled further and an acid-containing condensate is collected.

28 Claims, 1 Drawing Sheet

HEAT EXCHANGER AND POLLUTANT REMOVAL SYSTEM

CROSS-REFERENCE TO RELATED APPLICATIONS

This application is a continuation-in-part of U.S. patent application Ser. No. 07/372,492, filed Jun. 28, 1989, now abandoned, which is a continuation-in-part of U.S. application Ser. No. 07/165,312, filed Mar. 8, 1988, now U.S. Pat. No. 4,874,585.

FIELD OF THE INVENTION

This invention relates to an apparatus and method for exchanging heat and removing pollutants, particularly sulphur-based pollutants, from boiler plant flue gas.

BACKGROUND OF THE INVENTION

Numerous systems for removing pollutants from boiler plant flue gases are known in the art. The need for such systems has become particularly acute in recent years, as environmental concerns have become more prevalent.

Among the prior art systems are those which employ heat exchanger apparatus to cool flue gases and collect the condensate, which contains pollutants from the gases. By removing the condensate, pollutants are also removed. Examples of such techniques are seen in U.S. Pat. Nos. 4,876,986 to Johnson, which employs rotating rock beds to transfer heat, and 4,597,433 to Johnson, which employs large size pebble beds to transfer heat.

Although it is thus known in the prior art that flue gas condensation contains pollutants, and that causing such condensation is one way to remove pollutants, an effective system has not been developed which both removes substantially all pollutants and is capable of being readily retrofit onto existing power plant systems.

It is therefore a general object of the invention to provide a more efficient heat exchange between boiler plant flue gas and boiler feedwater contained in the tubes around the exterior surface of which the flue gas rapidly passes.

A further objective is to make a more perfect removal of sulphur and nitrogen oxides, as well as aerosols and particulates, from the flue gas.

A third objective is to make commercially valuable byproducts from the condensate which is produced when the flue gas of fossil-fuel fired boilers is cooled and the water in the flue gas condenses.

SUMMARY OF THE INVENTION

The present invention provides a more perfect removal of sulphur from flue gas by cooling the flue gas in two steps. In the first step the sulphur which has oxidized to $SO_3$ is condensed to $H_2SO_4$ and removed from the heat exchanger as sulphuric acid. Alternatively, by small additions of a base, such as ammonia, to the flue gas before it enters the heat exchanger, an ammonium sulphate solution is removed from the heat exchanger.

In the second step the flue gas is cooled in a much longer length of closely spaced layers of boiler feedwater tubes to dissolve the sulphur which has oxidized to $SO_2$, which is soluble in cold water. The $SO_2$ solution can then be subjected to vacuum to recover $SO_2$, which in turn can be absorbed in ammonium sulphite solutions to make ammonium sulphate.

The above two steps are performed by the heat exchanger by providing two condensing heat exchanger sections. In the first section just enough heat exchange occurs to condense all the $SO_3$ from the flue gas as $H_2SO_4$. A slanting trough at the base of this first section collects all the $H_2SO_4$. The flue gas then enters the second section of the heat exchanger, which is of a much longer vertical length in order to cool the flue gas enough so it is saturated with water. The condensate from this section contains dissolved pollutants and is subjected to vacuum treatment as disclosed above.

Further advantages arise when just enough ammonia is added to the flue gas (just ahead of its entry into the first section of the heat exchanger) to make ammonium sulphates or sulphites. Most importantly, the condensate is not as deleterious as the $H_2SO_4$ which is otherwise produced. In addition, condensation will begin at a higher temperature. Adding ammonia also allows for less expensive alloys such as cast iron to be used for the condenser tubes, because ammonia sulphates rather than corrosive sulphur containing acids are condensed.

To further improve heat exchange and pollutant removal, this invention recirculates through this "second-step condenser" as much as 90% of the condensed water after $SO_2$ is removed by vacuum therefrom. The recirculated water is used to dissolve practically all the $SO_2$ from the flue gas, and at the same time improve heat recovery from the flue gases to the boiler feedwater since a deluge of water in the flue gas both cools the flue gas by direct contact therewith and improves the heat exchange between the flue gas and the tubes carrying boiler feedwater. This is because the coefficient of heat exchange is higher for the recirculated water than for the flue gas. Therefore, the present invention discloses an improved apparatus and method for heat exchange in addition to an apparatus and method for removal of pollutants.

Thus this invention, with well-proven conventional flue gas heat exchangers heating boiler feedwater, can be retrofit to any power plant to both eliminate practically all flue gas contaminants and simultaneously improve power plant heat rate (KWH/Btu in fuel fired). Accordingly it is possible to produce either more power or the same amount of power and use 6% to 10% less fuel. It produces "acid rain" within the power plant flue gas condenser and converts it to ammonium sulphate fertilizer in a compact apparatus.

DETAILED DESCRIPTION OF THE PREFERRED EMBODIMENTS

Figure 1:
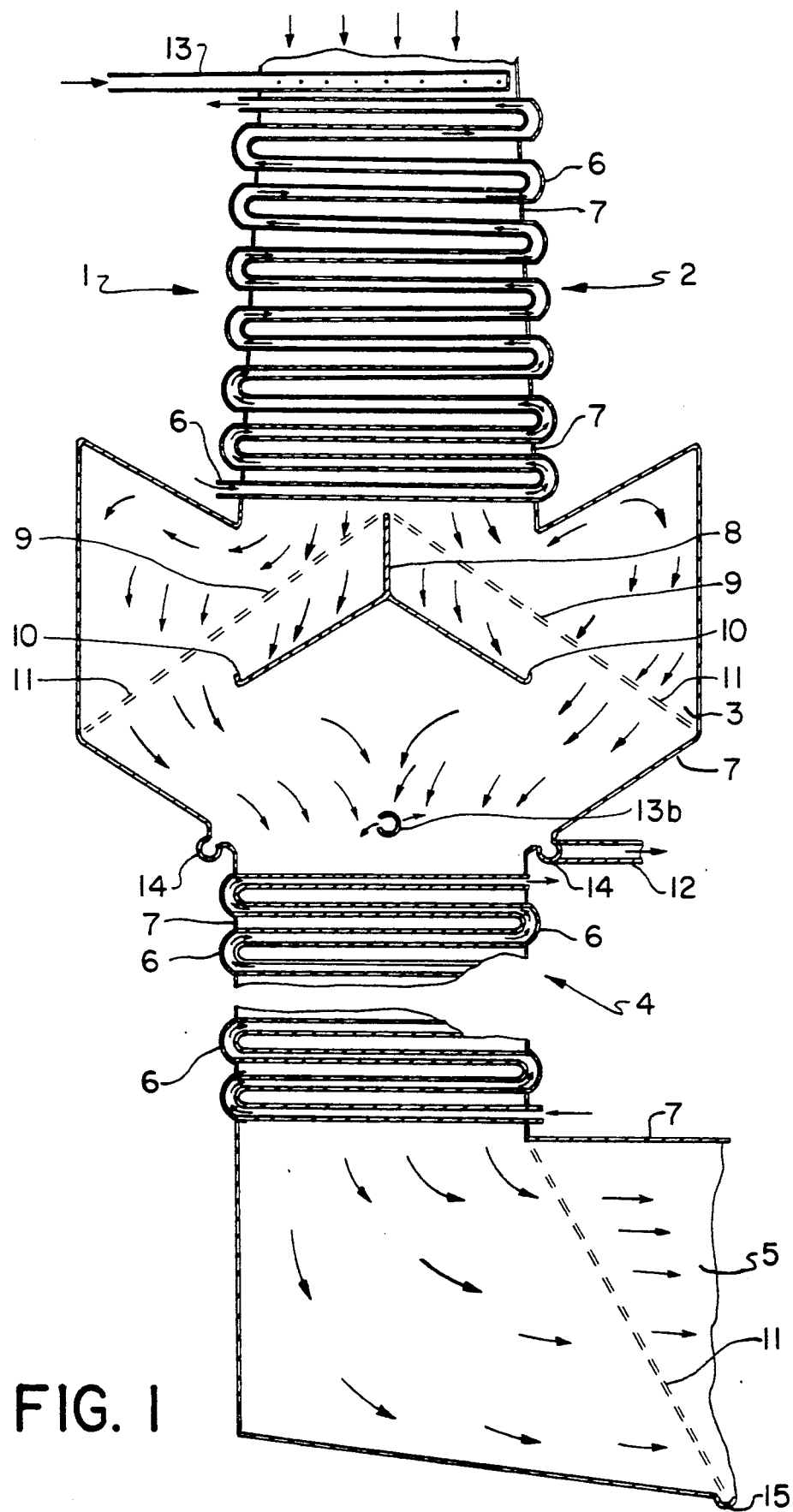
FIG. 1 is a vertical cross section through a preferred embodiment of a flue gas heat exchanger of the invention.

FIG. 1 illustrates a preferred device in accordance with the invention in the form of a heat exchanger 1 having a multiplicity of rows 2 of closely spaced heat exchanger tubes through which the flue gas is drawn downwardly. The flue gas then flows into a rectangular section 3 for demisting and collecting sulphuric acid condensing from the cooling flue gas. It then is cooled by a multiplicity of rows 4 of closely spaced heat exchanger tubes of much greater length than 2 before it enters the demisting and dewatering duct 5, cleaned of substantially all the unwanted chemical and particulate impurities before it enters an induced draft fan to force it up a short stack. The gas-tight casing 7 of the heat exchanger may be stainless steel or fiberglass in upper section 2 and midsection 3 but is preferably fiberglass in sections 4 and 5, given the lower temperatures there. The heat exchange tubes may be made of any material with good heat exchange properties and which can withstand the temperatures involved. A preferred material is Admiralty alloy, 90% copper and 10% nickel.

Rows 4 of heat exchanger tubes might extend 50 feet or more. The actual length will vary according to the particular application involved; the object is to provide enough heat exchange at each stage to carry out the desired processes. Therefore, a given power plant will require particular specifications depending on such factors as the type of fuel used and the concentration of pollutants in the flue gas, the temperature of flue gas produced, and the temperature of available boiler feedwater.

The acid resistant heat exchanger tubes 6 in the lower section 4 receive cold water at 4a from that which is used to condense the boiler plant steam and lead it back and forth upwardly counter-current to the downward flow of flue gas to exchange heat therewith. The partially heated water from section 4 is fed from 4b by piping (not shown) to the lowest tubes 6 of section 2 at 2a wherefrom it flows back and forth upwardly counter-current to the flue gas until it exits at 2b to conventional boiler feedwater pumps.

Midsection 3 of the heat exchanger is widened from the rest of the enclosure in order to slow the flue gas velocity, to facilitate condensation and collection of acid pollutants, and to accommodate means for collecting pollutants without obstruction of flue gas flow. The stream of flue gas entering the midsection 3 is divided by stainless steel plate 8 welded to the front and back of section 3, and the flue gas is deflected sideways therein by stainless steel plate 9 having slanting troughs 10 at its lower ends from which is drawn off sulphuric acid demisted to droplets. Together, steel plates 8 and 9 form an upside-down Y-shaped baffle. Similar troughs 14 are at the bottom of the gas tight stainless steel casing 7. The condensed sulphur containing acids are withdrawn through pipe 12 of section 3. The condensed acid withdrawn from troughs 10 and 14 may then be subjected to filtering by conventional means, for removing flyash particulates. The flyash particulates could also be removed by filtering of the flue gas prior to the heat exchange processes of the present invention.

Layered screens 11 are provided across midsection 3 just upstream of the baffles and troughs which collect condensate. Screens 11 aid in the condensation process by facilitating the formation of droplets, which are collected when they drop from the screens 11. Layered screens are much more effective than a single screen would be for encouraging condensation, and are therefore preferred.

According to a preferred embodiment of the invention, particulate material including acid mist and aerosols may be removed from the flue gas in the upper section 2 of the apparatus by inducing the particulates to become electrically charged and then collecting them at grounded surfaces. Particles will acquire a charge if they are carried by the flue gas past certain surfaces, particularly plastic surfaces. In the present invention, plastic sleeves may be placed over the heat exchanger tubes to produce an electric charge on the flue gas particulates. To collect the charged particles, surfaces downstream of the tubes are grounded, to attract the particles. In the embodiment of the invention shown in FIG. 1, layered screens 11 and stainless steel plates 8 and 9 may be grounded. In such case, the screens 11 should be made removable in order to dispose of the particulate material collected.

In the lowest section 5 of the heat exchanger a trough 15 collects acidic water demisted from the cooled flue gas and directs it to vacuum extraction means as described below. This acidic water contains dissolved $SO_2$ and condenses from the flue gas as it flows past tubes 6 in section 4 of the heat exchanger. Condensation and collection of the condensate are aided by another layered screen element 11, which serves the same function as in midsection 3. Casing 7 has a slanted base portion 16 which directs the condensate into trough 15.

Trough 15 delivers the condensate to means for removing the dissolved $SO_2$. Means may also be provided for filtering the condensate to remove particulates, either before or after extraction of $SO_2$.

After the dissolved sulphur dioxide has been extracted from this flue gas condensate, as much as 90% of the detoxified condensate may be recirculated by spraying it back into the flue gas through spray pipe 13b whereby a deluge of water is created, passing with the flue gas around the heat exchanger tubes of section 4. Recirculation both increases the amount of sulphur dioxide dissolved from the flue gas because of the greater amount of solvent present, and improves heat transfer from flue gas to boiler feedwater inside the tubes because of the temperature of the condensate and its effective coefficient of heat exchange. The location of pipe 13b is preferably at a point after the condensation and collection of acid in sections 2 and 3 of the heat exchanger to avoid dilution of the pollutants collected there, and additionally after water in the flue gas has begun to condense to avoid revaporization of the condensate and maximize heat exchange. This location will vary depending upon the specifications of each given application. Water can be expected to condense from flue gas below approximately 212° F., and pipe 13b should therefore be located at a point near where the flue gas is predicted to reach that temperature. This location may vary even within the same boiler plant, so that it may be desirable for pipe 13b to be adjustably located along a length of the enclosure.

Alternatively, pipe 13b could be located ahead of the first section 2 of the heat exchanger, and the condensate reintroduced at a point where the temperature of the flue gas is up to 900° F. The condensate would instantly vaporize in this configuration, but would cool the flue gas prior to heat exchange with boiler feedwater. Cooling by recirculation could assist the heat exchanger in upper section 2 as much as desired as long as the $H_2SO_4$ product of upper section 2 is collected before water condenses from the flue gas. Thus the combined cooling effect of recirculation and heat exchange should not lower the flue gas temperature below approximately 212° F. before troughs 10 and 14 collect concentrated $H_2SO_4$. Using the recirculated condensate to cool the flue gas in addition to the heat exchanger also increases the heat of condensation of the flue gas and therefore increases its capacity to exchange heat. As a result, a more efficient heat exchange process occurs in the apparatus. Generally speaking, a liquid has a greater coefficient of heat exchange than a gas, and a "wet" gas containing vapor has a greater coefficient than a dry gas. Therefore, recirculation improves heat exchange whether or not it is to a point where the condensate vaporizes.

In each of the above recirculation processes, an additional embodiment of the invention would not extract the dissolved pollutants before recirculation, but would recirculate the pollutant-containing condensate. This would be particularly useful in the embodiment where pollutant-containing condensate is recirculated to a point before the first section of the heat exchanger and oxygen is injected into the flue stream or recirculated condensate, as discussed below.

The $SO_2$ removed by extraction may be economically combined with ammonium sulphite solutions to produce ammonium sulphate, particularly in light of the concentrated nature of the extracted $SO_2$. Ammonium sulphate is used in large quantities as fertilizer, so that the pollutants in flue gas are converted by this invention to a useful material. Liquid $SO_2$ may also be yielded as a finished product by storing the extracted $SO_2$ in pressurized tanks.

One suitable apparatus for carrying out the extraction is disclosed in U.S. Pat. No. 4,802,897 to Johnson. By use of an n-shaped loop with sulphur dioxide pumped off at the top of the n by a vacuum pump exiting to a spray tower of ammonium bisulphite, ammonium sulphate can be inexpensively made from the recirculating water. Under vacuum a bubble, such as sulphur dioxide, expands as much as 150 times or more which makes the recirculating water rising in one leg of the n-shaped pipe lighter than that in the opposite leg from which gas has been extracted thus decreasing the pump power needed for recirculating. Sulphur dioxide is soluble in ammonium sulphite, and this makes it possible to dispense with a vacuum pump because gases and vapors are converted to a liquid which occupies a much smaller space.

Another suitable technique involves passing the vacuum-lifted or pumped recirculating water over packing material having a large surface area to facilitate the removal of dissolved gas from the liquid in which it is dissolved. Such a system is described in U.S. Pat. No. 4,781,797 to Johnson.

Enough horizontally disposed heat exchanger tubes would be employed in the first section 2 to cool the flue gas no lower than about 200° F. to produce $H_2SO_4$ as strong as possible or alternately just enough ammonia gas would be added above 550° F. to combine with the $H_2SO_4$ being formed to form $(NH_4)_2SO_4$ solution. Removing the $H_2SO_4$ as $(NH_4)_2SO_4$ has the additional advantage of causing more $SO_2$ to be oxidized to $SO_3$ by the law of mass action prevailing when an end component, i.e. $SO_3$, is removed as quickly as formed. It is preferable to remove as much $H_2SO_4$ or $(NH_4)_2SO_4$ in the first section 2 as possible. Ammonia sulfates may therefore be produced in the first section of the heat exchanger. Near the entry point of the hot flue gas into the heat exchanger, a highly acidic condensate is removed since sulphuric acid in the flue gas begins condensing with first one molecule of water as the compound $H_2SO_4 \times H_2O$ at 550° F. and with two molecules of water as the compound $H_2SO_4 \times H_2O$ at 332° F. In laboratory apparatus, only 0.01 ppm of $H_2SO_4$ remains at a temperature of 290° F. at which temperature a power plant flue gas would have to contain more than 20% moisture, (rather than usually less than 10%), before any water would condense unless combined with acids of sulphur or nitrogen, or with ammonia as discussed in the following.

Production of ammonium sulphates instead of sulphuric acid in upper section 2 is achieved by feeding in ammonia gas through pipe 13a ahead of condenser pipes 6 in approximately stoichiometric amounts necessary to combine with the sulphuric acid being condensed. A concentrated solution of ammonium sulphate may then be withdrawn via pipe 12, although weaker solutions may usually be necessary to insure extraction of substantially all sulphates. The condensate collected in this procedure may be subjected to filtering to separate flyash particulates from the useful soluble ammonia salts. Conventional filtering means are appropriate for this objective.

In a typical application of the invention, the condensing heat exchanger tubes would be disposed horizontally to cool the flue gas down to about 200° F. to produce a strong sulphuric acid, or by adding just enough ammonia to the flue gas at 550° F. or less, to produce an ammonium sulphate solution. Either solution is collected in trough 10 or 14 before the flue gas is again directed downwardly to be cooled to 80° F. or, if desired, to lower temperatures by heat exchange with boiler feedwater.

If the flue gas lacks sufficient oxygen and nitric oxide for the reactions in the first heat exchanger section to remove all the pollutants, the second section of condenser tubes, which section might be as long as 50 feet or more, is used to dissolve $SO_2$ in the condensation and cold recirculated water.

From the foregoing, it is apparent that this invention may, in a first step of flue gas cooling, extract sulphur which has oxidized to $SO_3$ and, in a second step, extract sulphur which has only oxidized to $SO_2$ because of an insufficient concentration of $O_2$ remaining in the flue gas after combustion in the boiler house, particularly since it is diluted with $N_2$ and $CO_2$ in the flue gas. However, according to the present invention, the proportion of $SO_3$ to $SO_2$ may be increased by a third step consisting of injecting oxygen gas derived from the liquefaction of air, which currently costs about 1.8¢/lb $O_2$ including 170 watts/lb $O_2$ liquefaction energy. By adding this step, the removal of pollutants in the first section of the apparatus can be more complete, because the proportion of $SO_3$ to $SO_2$ in the flue gas is increased. Up to 20 times the theoretical amount of $O_2$ needed to oxidize the $SO_2$ in the flue gas to $SO_3$ may be used economically.

An alternative to injection of oxygen directly into the flue gas stream is to inject oxygen into the condensate recirculated from the second section 4 of the heat exchanger, where such a recirculation step is used, and where the condensate is recirculated to a point at or before the first section 2 of the heat exchanger. The $SO_2$ in the flue gas and condensate may by this procedure be converted to $SO_3$ and removed in the first section as $H_2SO_4$. Yet another alternative would be to recirculate the condensate, whether or not pollutants had been removed, and to inject oxygen separately into the flue gas stream.

Other oxygen-containing substances may be injected in any of the above processes, instead of pure oxygen, depending on cost and availability. Air, ozone, or any other substance capable of oxidizing $SO_2$ to $SO_3$ may be used.

EXAMPLES

The utility of this invention as a means of eliminating sulphur dioxide or trioxide from the flue gas of coal-fired power plants may be better seen by the following examples.

EXAMPLE 1

It is typical in the burning of coal in a power plant for about 10 pounds of flue gas to be produced per pound of coal, and for 8% of flue gas to be present as $H_2O$, and 1% to be S. Based on the 1% S content in coal, there is at most 80/32 (molecular weight ratio of $SO_3/S$) $\times 1\% = 2.5\%$ $SO_3$, providing there is enough $O_2$ in flue gas to oxidize $SO_2$ there to $SO_3$.

FROM CHEMICAL HANDBOOKS:
below 550° F. one molecule of $SO_3$ combines with one of $H_2O$ making $H_2SO_4 \times H_2O$
below 332° F. one molecule of $SO_3$ combines with two $H_2O$ making $H_2SO_4 \times 2H_2O$
below 250° F. one molecule of $SO_3$ combines with four $H_2O$ making $H_2SO_4 \times 4H_2O$ thus below 250° F.: $7H_2O + 7SO_3 \rightarrow 7H_2SO_4$, where $H_2O$, $SO_3$, and $H_2SO_4$ have molecular weights of 126, 560, and 686 respectively. Thus the above 1% S in coal making 2.5% $SO_3$ can remove only $126/560 \times 2.5\% = 0.56\%$ water in flue gas out of 8%. This means that $8 - 0.56 = 7.44\%$ of flue gas is water, and so $7.44/8 = 93\%$ of water remains in the flue gas. Therefore, if not all $SO_2$ in the flue gas is oxidized to $SO_3$, a minimum of 93% of the water in the flue gas would remain for dissolving the $SO_2$ in the second heat exchange step.

EXAMPLE 2

If the flue gas lacks sufficient $O_2$ or $NO_2$ to oxidize all oxides of S to $SO_3$ this invention provides a second section of boiler-feedwater-cooled heat exchanger tubes which might extend in closely spaced layers of tubes 50 feet or more to cool the flue gas as low as 80° F. or less. At 80° F. about 75% of the flue gas water will condense or $0.75 \times 8\% = 0.6$ lb/lb coal fired. From Table II below this water will dissolve 8.73% $SO_2 = 0.0873 \times 0.6 = 0.052$ lbs $SO_2$. Because the estimated 1% S in coal translates into 64/32 (molecular weight ratio of $SO_2/S$)$\times 1\% = 2\%$ $SO_2$, only 0.02 lbs $SO_2$ would need to be dissolved, much less than the 0.052 lbs which could be dissolved. Thus, even 2.5% S coal would probably have sufficient water condensing to dissolve therein as $SO_2$ all S in coal. The $SO_2$ can be recovered from condensate by subjecting it to vacuum. Preferably sulphurous acid is recovered and converted to sulphates of ammonia which may be sold as fertilizer, or sodium sulphite which may be sold for use in the paper industry.

EXAMPLE 3

The feasibility of extracting the sulphur dioxide from the large amount of recirculating water is apparent from the large difference in vapor pressure between water and sulphur dioxide being around 100/1 to 200/1 as seen in TABLE I.

TABLE I

VAPOR PRESSURES OF WATER AND SULPHUR DIOXIDE AND RATIOS BETWEEN THESE AT VARIOUS TEMPERATURES

| Temperature Degrees Fahrenheit | Vapor Pressure lb. per sq. inch absolute | | Ratio of Vapor Pressure $SO_2/H_2O$ |
|---|---|---|---|
| | $SO_2$ | $H_2O$ | |
| 50 | 33.4 | 0.18 | 186 |
| 60 | 40.9 | 0.26 | 157 |
| 70 | 49.6 | 0.36 | 138 |
| 80 | 59.7 | 0.51 | 117 |
| 90 | 71.3 | 0.71 | 102 |
| 100 | 84.5 | 0.95 | 89 |

When the fuel fired is high in sulphur content, as for example with 4% sulphur coal, it is economically important to use the lowest temperature boiler feedwater possible, in order to assure sufficient cooling of the flue gases to remove all pollutants. This is possible in the winter months when rivers and lakes reach freezing temperatures. As seen in Table II, water at 32° F. dissolves 22.83% its weight of sulphur dioxide compared to 8.73% at 80° F. Accordingly, this invention provides that high sulphur coal be used when cold cooling water is available (i.e., during the winter months) while lower sulphur coal could be used at other times. In addition, the water can be cooled by the use of chillers or the like to the appropriate temperature necessary to dissolve the sulphur dioxide which is generated by burning the fuel.

TABLE II

GRAMS OF SULPHUR DIOXIDE SOLUBLE IN 100 GRAMS OF WATER AT VARIOUS TEMPERATURES

| DEGREES Fahrenheit | GRAMS $SO_2$ |
|---|---|
| 32 | 22.83 |
| 50 | 16.21 |
| 68 | 11.28 |
| 80 | 8.73 |
| 104 | 5.41 |

EXAMPLE 4

The injection of oxygen was explained above as a way of improving the degree of removal of pollutants in the first section of the apparatus. As can be seen from the following TABLE III, it may be desirable to inject into the flue gas flowstream conduit ahead of the apparatus of FIG. 1 as much as 20 times as much $O_2$ as theoretically required since it is paid for by the ammonium sulphate recovered when it is worth $130/ton and ammonia to make it costs $120/ton. That is, $20 \times 1.8¢ = \$3.60$, which is less than $4.08.

TABLE III

ASSUME COAL CONTAINS 1% S

MOL WEIGHT = 16 + 64 + 18 + 34 = 132
(1% S = 40 lbs $SO_2$)½$O_2$ + $SO_2$ + $H_2O$ + 2$NH_3$ → $(NH_4)_2SO_4$
lbs/ton coal = 10 + 40 + 11.25 + 21.25 = 82.5
value/ton coal = 0    0    0    − $1.28 = +$5.36 =
net $4.08

Any combination of these steps may be used to completely remove $SO_2$ and $NO_X$ the latter of which is subject to oxidation with added $O_2$ and itself rapidly reacts with $SO_2$ to make $H_2SO_4$.

I claim:
1. A method for recovery of heat and removal of $SO_2$ and $SO_3$ pollutants from fossil fuel fired boiler plant flue gas, which comprises:

forming a first condensate by cooling such flue gas to below the condensation point of sulfuric acid but above the condensation point of water so that substantially all $SO_3$ in said flue gas combines with $H_2O$ and condenses as $H_2SO_4 \cdot X\ H_2O$ where X is an integer of 4 or less.

forming a second condensate of water and dissolved $SO_2$ by cooling the flue gas to condensate water and dissolve $SO_2$ therein;

collecting the first condensate before said second condensate is formed;

treating the second condensate to remove at least a portion of the dissolved $SO_2$ to obtain an $SO_2$ depleted condensate;

recirculating a sufficient portion of the $SO_2$ depleted condensate into the flue gas downstream of where the first condensate is collected but upstream of where the second condensate is formed.

2. The method of claim 1 wherein the $SO_3$ and water in the first condensate is present as $H_2SO_4 \cdot 1\ H_2O$, $H_2SO_4 \cdot 2\ H_2O$, or mixtures thereof.

3. The method of claim 1 wherein substantially all dissolved $SO_2$ is removed from the second condensate.

4. The method of claim 1 which further comprises filtering the second condensate to remove particulates therefrom.

5. The method of claim 4 wherein the second condensate is filtered after the treatment to remove the dissolved $SO_2$ portion.

6. The method of claim 1 which further comprises increasing the oxygen content of the flue gas to enhance the oxidation of $SO_2$ in the flue gas to $SO_3$ prior to forming the first condensate.

7. The method of claim 6 wherein the oxygen content of the flue gas is increased by introducing oxygen, air or ozone therein.

8. The method of claim 1 wherein each of the first and second condensates is formed by indirect heat exchange between the flue gas and boiler feedwater, the recirculation of the $SO_2$ depleted condensate portion into the flue gas increases the heat transfer coefficient between the flue gas and the boiler feedwater, and heat is recovered from the boiler feedwater.

9. A method for recovery of heat and removal of $SO_2$ and $SO_3$ pollutants from fossil fuel fired boiler plant flue gas, which comprises:

forming a first condensate by cooling such flue gas to below the condensation point of sulfuric acid but above about 550° F. and above the condensation point of water;

adding ammonia to the flue gas upstream of where the first condensate is formed in an amount sufficient to form sulphate salts from the $SO_3$ pollutants in the flue gas but no greater than the stoichiometric amount necessary to react with substantially all of the $SO_3$ pollutants;

forming ammonium salts from the $SO_3$ pollutants as the first condensate is formed; and collecting the ammonium salts as a solution prior to further cooling of the flue gas.

10. The method of claim 9 wherein the ammonium salts are collected as a concentrated solution.

11. The method of claim 9 which further comprises forming a second condensate of water and dissolved $SO_2$ after collecting the ammonium salts by cooling the flue gas to condense water and dissolve $SO_2$ therein;

treating the second condensate to remove at least a portion of the dissolved $SO_2$ to obtain an $SO_2$ depleted condensate;

recirculating a sufficient portion of the $SO_2$ depleted condensate into the flue gas downstream of where the ammonium salts are collected but upstream of where the second condensate is formed.

12. The method of claim 11 wherein substantially all of the dissolved $SO_2$ is removed from the second condensate during said treatment.

13. The method of claim 11 which further comprises filtering the second condensate to remove particulates therefrom.

14. The method of claim 13 wherein the second condensate is filtered after the treatment to remove the $SO_2$ portion.

15. The method of claim 9 which further comprises increasing the oxygen content of the flue gas to enhance the oxidation of $SO_2$ in the flue gas to $SO_3$ prior to forming the first condensate.

16. The method of claim 15 wherein the oxygen content of the flue gas is increased by introducing oxygen, air or ozone therein.

17. The method of claim 11 wherein each of the first and second condensates is formed by indirect heat exchange between the flue gas and boiler feedwater, the recirculation of the $SO_2$ depleted condensate portion into the flue gas increases the heat transfer coefficient between the flue gas and the boiler feedwater, and heat is recovered from the boiler feedwater.

18. The method of claim 9 wherein the first condensate is formed by indirect heat exchange between the flue gas and boiler feedwater, and which further comprises:

forming a second condensate after collecting the ammonium salts by cooling the flue gas to condense water;

recirculating at least a portion of the second condensate into the flue gas prior to where the first condensate is formed to increase the heat transfer coefficient between the flue gas and the boiler feedwater; and recovering heat from the boiler feedwater.

19. A method for recovery of heat and removal of $SO_2$ or $SO_3$ pollutants from fossil fuel fired boiler plant flue gas, which comprises:

forming a first condensate by cooling such flue gas to below the condensation point of sulfuric acid above about 200° F. and above the condensation point of water by indirect heat exchange between the flue gas and boiler feedwater so that substantially all $SO_3$ in said flue gas combines with $H_2O$ and condenses as a compound which contains $SO_4^{-2}$ ions;

forming a second condensate of water and dissolved $SO_2$ by cooling the flue gas by indirect heat exchange between the flue gas and boiler feedwater to condense water and dissolve $SO_2$ therein;

collecting the first condensate before said second condensate is formed;

treating the second condensate to reduce the amount of dissolved $SO_2$ and obtain an $SO_2$ depleted condensate;

recirculating a sufficient portion of the $SO_2$ depleted condensate back into the flue gas to increase the heat transfer coefficient between the flue gas and the boiler feedwater; and recovering heat from the boiler feedwater.

20. The method of claim 19 wherein the second condensate is subjected to a vacuum treatment to remove at least a portion of the dissolved $SO_2$ from the second condensate.

21. The method of claim 20 wherein substantially all dissolved $SO_2$ is removed from the second condensate.

22. The method of claim 20 which further comprises recirculating the $SO_2$ depleted condensate into the flue gas downstream of where the first condensate is collected but upstream of where the second condensate is formed.

23. The method of claim 19 which further comprises filtering the second condensate to remove particulates therefrom.

24. The method of claim 23 wherein the second condensate is filtered after the treatment to reduce the dissolved $SO_2$ portion.

25. The method of claim 19 which further comprises increasing the oxygen content of the flue gas to enhance the oxidation of $SO_2$ in the flue gas to $SO_3$ prior to forming the first condensate.

26. The method of claim 25 wherein the oxygen content of the flue gas is increased by introducing oxygen, air or ozone therein.

27. The method of claim 19 wherein the second condensate is treated by oxidizing dissolved $SO_2$ to $SO_3$, and which further comprises recirculating a portion of the oxidized second condensate into the flue gas upstream of where the first condensate is formed.

28. The method of claim 27 wherein the second condensate is treated by introducing oxygen, air or ozone therein to effect such oxidizing.

* * * * *